United States Patent [19]

Schönfelder et al.

[11] 4,456,647

[45] Jun. 26, 1984

[54] PLASTICS MOULDINGS FINISHED WITH A THREE-LAYER COATING AND A PROCESS FOR PRODUCING THE FINISH

[75] Inventors: Manfred Schönfelder; Helmut Steinberger, both of Leverkusen; Helmut Schmid, Krefeld, all of Fed. Rep. of Germany

[73] Assignee: Bayer Aktiengesellschaft, Leverkusen, Fed. Rep. of Germany

[21] Appl. No.: 448,839

[22] Filed: Dec. 10, 1982

[30] Foreign Application Priority Data

Dec. 24, 1981 [DE] Fed. Rep. of Germany ....... 3151350

[51] Int. Cl.³ .......................... C08J 7/04; B32B 7/02; B32B 27/30; B32B 27/42
[52] U.S. Cl. ................................. 428/216; 427/385.5; 427/387; 427/393.5; 427/407.1; 427/412.1; 428/412; 428/423.1; 428/423.3; 428/424.4; 428/425.3; 428/425.5; 428/425.6; 428/447; 428/502; 428/520; 428/522; 428/524
[58] Field of Search ............... 428/447, 216, 412, 502, 428/520, 522, 524, 423.1, 424.4, 425.3, 425.5, 425.6, 423.3; 427/387, 385.5, 393.5, 412.1, 407.1

[56] References Cited

U.S. PATENT DOCUMENTS

| | | | |
|---|---|---|---|
| 3,582,398 | 6/1971 | Ringler | 428/412 |
| 3,707,397 | 12/1972 | Gagnon | 428/412 |
| 4,224,378 | 9/1980 | Schroeter | 428/412 |
| 4,242,412 | 12/1980 | Funaki | 428/412 |

Primary Examiner—Ellis P. Robinson
Attorney, Agent, or Firm—Connolly and Hutz

[57] ABSTRACT

The invention relates to plastics mouldings, more particularly transparent plastics mouldings, which are finished with a coating of three successively stoved, chemically different layers, and to a process for producing the finish. The special finish considerably improves the scratch resistance, abrasion resistance, weathering resistance and yellowing resistance of the plastics surfaces without affecting the transparency of the plastics moulding. The first layer (primer layer) is produced from a hardenable acrylic resin and an aminoplast resin, the second layer from a thermoplastic acrylic resin, a plasticizer and a masked polyisocyanate and the third layer (cover layer) from at least one partially hydrolyzed organosilane, an α,ω-dihydroxy polydimethyl siloxane, a silica sol and at least one masked polyisocyanate as binder in the presence of a water-soluble organic or inorganic acid. The three-layer coating contains UV-absorbers, light stabilizers and, optionally, standard auxiliaries.

4 Claims, No Drawings

PLASTICS MOULDINGS FINISHED WITH A THREE-LAYER COATING AND A PROCESS FOR PRODUCING THE FINISH

This invention relates to plastics mouldings, more particularly transparent plastics mouldings, which are finished with a coating of three successively stoved, chemically different layers, and to a process for producing the finish. The special finish considerably improves the scratch resistance, abrasion resistance, weathering resistance and resistance to yellowing of the plastics surfaces without impairing the transparency of the plastics moulding. The first layer (primer layer) is produced from a hardenable acrylic resin and an aminoplast resin, the second layer from a thermoplastic acrylic resin, a plasticiser and a masked polyisocyanate and the third layer (cover layer) from at least one partially hydrolysed organosilane, an, α,ω-dihydroxy polydimethyl siloxane, a silica sol and at least one masked polyisocyanate as binder in the presence of a water-soluble organic or inorganic acid. The 3-layer coating contains UV-absorbers, light stabilisers and, optionally standard auxilaries.

It is known from DE-AS No. 1,694,273 (=U.S. Pat. No. 3,582,398) that the surface of polycarbonate mouldings can be coated with a 0.5 to 20% by weight solution of a polymethyl methacrylate containing UV-absorbers followed by removal of the solvent. The stoved coating is said to improve the transparency to light of the moulding. However, polycarbonate surfaces finished in this way show inadequate scratch resistance and abrasion resistance because, to improve these two properties, the same Applicant describes in U.S. Pat. No. 4,224,378 polycarbonate mouldings which are primed with a thermoplastic acrylic resin, particularly polymethyl methacrylate, in a layer thickness of from 50 to 25,000 nm, stoved and subsequently provided with a cover layer produced from a partially hydrolysed alkyl or aryl trialkoxy silane (=hardenable organopolysiloxane). The thermoplastic primer layer may contain UV-absorbers, matting agents and surface-active agents whilst the crosslinked polysiloxane cover layer may contain colloidal silica. The polycarbonate moulding surfaces thus obtained are said to be hard, abrasion-resistant and solvent-resistant. However, as can clearly be seen from Comparison Test 1 of the present Application, the coating obtained in accordance with Examples 2, 3 and 4 of U.S. Pat. No. 4,224,378 (primer layer approximately 500 nm thick, cover layer approximately 6000 nm thick), although being optically satisfactory, transparent and free from cracks in the cover layer, does not show the necessary weather resistance. After only about 1000 hours' artificial weathering, flaking-off of the layers and yellowing of the polycarbonate are observed. If a primer layer approximately 11,900 nm thick and a cover layer approximately 6000 nm thick are produced, the stoved cover layer shows serious crack formation. In other words, mouldings of the type in question are unsuitable for practical application.

It is also known that the surfaces of plastics mouldings of polycarbonate or thermoplastic poly(meth)acrylates can be primed with thermosetting acrylic resins and finished with a cover layer of hardenable organopolysiloxanes (cf. U.S. Pat. No. 3,707,397) in order to improve the hardness and solvent resistance of the surfaces. According to U.S. Pat. No. 4,224,378, column 1, line 57 to column 2, line 3, the abrasion resistance and bond strength of the cover layer in coatings of the type in question deteriorates with increasing thickness of the primer layer. According to Comparison Test 2 of the present Application, completely inadequate resistance to weathering and yellowing is observed where thermosetting acrylic resins are used for the primer layer (thickness 250 nm) and hardenable organopolysiloxanes for the cover layer (thickness 12,500 nm). With a primer layer 12,500 nm thick and a cover layer 12,500 nm thick, crazing in the cover layer is observed during the stoving thereof.

Finally, it is known from DE-OS No. 28 42 048 (=U.S. Pat. No. 4,242,412) that transparent or opaque plastic mouldings of, for example, polyacrylic resins, polycarbonate etc. can be provided with a three-layer coating which adheres firmly to the moulding and which is said to impart scratch resistance and anti-blooming properties to the moulding. The primer layer is produced from a hardenable acrylic resin, the second layer from (a) a mixture of completely or partly etherified methylol melamines and an optionally alkoxylated polyol having a molecular weight below 1500 and/or (b) a hardenable acrylic resin, and the third layer (cover layer) from (a) a mixture or precondensate of a partly or completely etherified methylol melamine and an ethoxylated polyol having a molecular weight of from 100 to 2000 and (b) a surface-active agent.

Although, after stoving, the coated polycarbonate mouldings obtained in accordance with the above publication show a certain improvement in their scratch resistance by comparison with uncoated mouldings, their scratch resistance after weathering deteriorates substantially to the levels of the uncoated polycarbonate mouldings.

Most plastics are only suitable to a limited extent for numerous applications on account of their inadequate scratch resistance and abrasion resistance and their lack of resistance to weathering and yellowing. This applies, for example, to thermoplastic plastics mouldings, particularly transparent mouldings, of polycarbonate, polymethyl methacrylate, polyamide and polyesters. Although it is possible to improve scratch resistance and abrasion resistance considerably by applying coatings of thermosetting coating compositions based, for example, on polysiloxane systems, resistance to weathering is inadequate, resulting in separation of the scratch-resistance coating composition and in yellowing of the plastic (for example in the case of polycarbonate). A distinct improvement in resistance to weathering and yellowing is obtained by using a polymer containing UV-absorbers and light stabilisers. By comparison with non-primed scratch-resistant coatings, separation by the primer occurs at a much later stage. However, the protective effect of the primer is limited by the fact that, with increasing thickness of the primer layer and/or increasing concentration of UV-absorbers, crazing occurs in the polysiloxane layer (cover layer) during the actual stoving of the scratch resistant coating (cover layer).

Accordingly, an object of the present invention is to finish plastics with a coating which, without crazing, not only shows high abrasion resistance and scratch resistance, but which also imparts excellent resistance to weathering and yellowing to the moulding. The coating is, of course, intended to adhere firmly to the moulding, even after prolonged weathering.

According to the invention, this object is achieved by finishing the plastics moulding with a coating of three successively stoved, chemically different layers, as expressed in the claim.

Accordingly, the present invention provides plastics mouldings finished with a coating of three successively stoved layers, characterised in that the first stoved layer applied to the surface of the plastics moulding is produced from a binder mixture of a hardenable acrylic resin and an aminoplast resin and contains at least one UV-absorber and at least one light stabiliser, the second stoved layer is produced from a binder mixture of a thermoplastic acrylic resin, a masked polyisocyanate and a plasticiser, and the third stoved layer is produced from a binder mixture of at least one partially hydrolysed organosiloxane, an α,ω-dihydroxypolydimethyl siloxane, a silica sol and at least one masked polyisocyanate in the presence of a water-soluble organic or inorganic acid and contains at least one UV-absorber.

In addition, the individual layers 1 to 3 may contain standard auxiliaries.

The present invention also relates to a process for producing the finish.

In the context of the invention, plastics mouldings consist of thermoplastic polymers of the type which do not undergo any significant change in their dimensional stability at the temperatures at which the coatings are stoved, i.e. at temperatures in the range of from about 30° to 180° C., preferably from 100° to 130° C. The mouldings preferably consist of polycarbonates, poly(meth)acrylate homopolymers and copolymers and polyamides, more particularly of polycarbonates or thermoplastic aliphatic and/or aromatic polyesters and polymethyl methacrylate. Polycarbonates are the most preferred.

The plastics mouldings may be transparent and colourless, transparent and coloured, opaque, pigmented and/or provided with fillers or reinforced by inorganic or organic fibres, filaments, woven fabrics, knitted fabrics, nonwoven fabrics or net fabrics. The plastics mouldings are preferably transparent and colourless as are the plastics mouldings finished in accordance with the invention. In the context of the invention, plastics mouldings are understood to be, for example, sheets, panels, films, windscreens and windows for motor vehicles, for industrial appliances and domestic appliances, helmet visors, optical lenses, face-masks, sightscreens, housings for domestic articles, for medical, industrial and electrical appliances, helmets, rods, profiles, masts, tool handles, moulded bodywork components, table tops, furniture, furniture components, etc.

The polymers on which the plastics mouldings are based are generally known. For example, polycarbonates are described by Herman Schnell in "Chemistry and Physics of Polycarbonates", 1964, Interscience Publishers, New York; poly(meth)acrylate homopolymers and poly(meth)acrylate copolymers are described inter alia in Houben-Weyl, Methoden der Organischen Chemie, Georg Thieme Verlag, Stuttgart, 1961, 4th Edition, Vol. XIV/1, pages 1033–1079, and polyamides in Houben-Weyl, Methoden der Organischen Chemie, Georg Thieme Verlag, Stuttgart, 1963, 4th Edition, Vol. XIV/2, pages 99 to 191.

Particularly suitable polycarbonates have average molecular weights (weight average) $\overline{M}w$ of from 10,000 to 100,000 preferably from 20,000 to 40,000, as determined by measurement of the relative viscosity of a 0.5% by weight solution in $CH_2Cl_2$ at a temperature of 25° C.

The plastics mouldings according to the present Application are finished with a coating of three successively stoved layers, the stoved, preferably transparent, layers generally having the following thicknesses, starting from the layer situated nearest the surface of the moulding:

1st layer (primer layer): 100 to 30,000 nm, preferably from 2000 to 8000 nm;

2nd layer: 10 to 5000 nm, preferably from 100 to 2000 nm;

3rd layer (cover layer): 1000 to 30,000 nm, preferably from 4000 to 10,000 nm.

The first layer of the coating (primer layer) is produced by stoving a hardenable acrylic resin and an aminoplast resin and contains at least one UV-absorber and at least one light stabiliser and, optionally, other standard auxiliaries.

In the context of the invention, hardenable acrylate resins are preferably understood to be copolymers of copolymerised units of A. from 50 to 95% by weight of at least one (meth)acrylic acid alkyl ester containing from 1 to 8 carbon atoms in the alcohol component, and B. from 5 to 50% by weight of at least one other olefinically unsaturated monomer containing at least one of the following groups: hydroxy, carboxy, carbamoyl ($H_2N$—CO—), N-methylol carbamoyl (HO—CH$_2$—NH—CO—), N-alkoxy methyl carbamoyl (R—O—CH$_2$—NH—CO—CO—, R=$C_1$-$C_4$alkyl) or 1,2-epoxy groups, and C. optionally up to 30% by weight of at least one aliphatic or aromatic vinyl or vinylidene monomer, the sum of the percentages by weight of A.+B.+C. amounting to 100.

The average molecular weights $\overline{M}n$ of the hardenable acrylic resins are preferably in the range of from 1000 to 80,000 and more preferably in the range of from 1000 to 10,000, as measured by gel permeation chromatography.

The hardenable acrylic resins containing incorporated carboxy groups may be at least partly modified (esterified) with epoxide compounds containing at least one 1,2-epoxide group (for example diepoxides based on bisphenol A). On the other hand, hardenable acrylate resins containing 1,2-epoxide groups may be at least partly esterified with aliphatic saturated $C_1$-$C_{12}$-monocarboxylic acids or with cycloaliphatic $C_7$-$C_{12}$-dicarboxylic acids or their anhydrides.

Monomers belonging to group B are, for example, 2-hydroxyethyl (meth)acrylate, 2-hydroxypropyl (meth)acrylate, 4-hydroxybutyl (meth)acrylate, (meth)acrylic acid, maleic acid, fumaric acid, itaconic acid, (meth)acrylamide, N-methylol (meth)acrylamide, N-alkoxymethyl ethers of (meth)acrylic acid amide containing from 1 to 4 carbon atoms in the alkyl group, (meth)acrylic acid glycidyl esters, fumaric acid diglycidol esters, etc.

Group C includes, for example, styrene, styrene nucleus-substituted and side-chain-substituted by $C_1$-$C_4$-alkyl groups, vinyl acetate, (meth)acrylonitrile, vinyl chloride, vinylidene chloride, etc.

The hardenable acrylic resins are known and are obtained by known methods (cf U.S. Pat. Nos. 2,604,463; 2,729,625; 2,681,897; 3,083,184; 3,330,814; 3,375,227; DE-PS No. 1,965,740; DE-OS No. 20 57 577 and GB-PS Nos. 1,227,398 and 1,515,868).

Particularly preferred hardenable acrylic resins are copolymers of copolymerised units of 1. from 55 to 70% by weight of methylmethacrylate,
2. from 10 to 20% by weight of at least one hydroxyalkyl (meth)acrylate containing from 2 to 4 carbon atoms in the alkyl group and
3. from 10 to 35% by weight of at least one acrylic acid alkyl ester containing from 1 to 8 carbon atoms in the alcohol radical or at least one methacrylic acid alkyl ester containing from 2 to 8 carbon atoms in the alcohol radical or mixtures thereof.

The aminoplast resins which may be used for the primer layer are, for example, melamine aldehyde resins, particularly melamine formaldehyde resins, of which the methylol groups may be completely or partly etherified by aliphatic, saturated monoalcohols containing from 1 to 4 carbon atoms. Other aminoplasts are derived from urea, dicyanodiamide, ammeline, benzoguanamine and other 1,3,5-triazines substituted by amino and phenyl, alkyl, halogen or hydroxy groups, are modified with aldehydes, particularly formaldehyde, and may be completely or partly etherified with aliphatic, saturated $C_1$–$C_4$-monoalcohols. The aminoplast resins have long been known (cf for example U.S. Pat. No. 2,681,987). Aminoplasts based on melamine are preferred, hexamethoxy methyl melamine being particularly preferred.

The binder used for the primer (layer 1) is a mixture of an aminoplast resin and a hardenable acrylic resin of which from 20 to 40% by weight preferably consists of hardenable acrylic resins and from 60 to 80% by weight of aminoplast. The stoved first layer (primer layer) may contain the condensed units of the two constituents in substantially equal proportions by weight (less the quantities of water and/or alcohols given off during condensation in the course of the stoving process).

To protect the plastic moulding, the primer layer contains at least one standard UV-absorber in quantities of from 1 to 100% by weight, preferably from 20 to 30% by weight, always based on the sum of the quantities of aminoplast and hardenable acrylic resin. UV-absorbers of the type in question are, for example, benztriazole compounds of the type described in detail inter alia in DE-PS No. 1,185,610=U.S. Pat. No. 3,189,615. Preferred UV-absorbers are 2-(2'-hydroxy-3',5'-diamylphenyl)-benztriazole and 2-(2'-hydroxy-5'-methylphenyl)-benztriazole.

Another group of UV-absorbers is derived from benzophenone derivatives containing at least one hydroxy group. They are described in detail, for example, in U.S. Pat. Nos. 3,043,709; 3,049,443; 2,693,492, 2,853,521 and 2,777,828. Of the above-mentioned benzophenone derivatives, it is preferred to use 2-hydroxy-4-methoxy benzophenone, 4-decyloxy-2-hydroxy benzophenone, 2,2'-4,4'-tetrahydroxy benzophenone, 2,4-dihydroxybenzophenone, 2-hydroxy-4-n-octyloxy benzophenone and 2-hydroxy-4-n-dodecyloxy benzophenone.

Of the various classes of UV-absorbers which may be present in the primer layer, the benztriazole compounds are preferred.

To protect the primer, the primer layer also contains a light stabiliser in quantities of from 0.1 to 5% by weight, preferably from 0.5 to 2% by weight, based on the sum of the quantities of aminoplast and hardenable acrylic resin. Suitable light stabilisers are, for example, sterically hindered amines of the type described inter alia in DE-OS No. 24 17 535 (=U.S. Pat. Nos. 4,123,418 and 4,110,304) and in DE-OS No. 24 56 864 (=U.S. Pat. No. 3,993,655 and 4,221,701). Preferred compounds are bis-(1,2,2,6,6-pentamethyl-4-piperidyl)-sebacate, bis-(2,2,6,6-tetramethyl-4-piperidyl)-sebacate, and n-butyl-(3,5-di-tert.-butyl-4-hydroxybenzyl)-malonic acid-bis-(1,2,2,6,6-pentamethyl-4-piperidyl)-ester.

The primer layer may also contain standard auxiliaries such as, for example catalysts, such as p-toluene sulphonic acid, etc., levelling agents, such as cellulose esters, oligoalkyl acrylates containing from 2 to 8 carbon atoms in the alkyl group, silicone oils etc. and deaerating agents, such as high-boiling solvents, in the usual quantities of, in each case, from 0.1 to 2% by weight, based on the binder of aminoplast and hardenable acrylic resin. In cases where it is desired to finish pigmented, filled or reinforced mouldings rather than transparent plastics mouldings with coatings, the primer layer may also contain dyes or pigments dissolved in the binder.

The primer may be produced by dissolving the hardenable acrylic resin and the aminoplast in an organic solvent, such as toluene, xylene, ethyl glycol acetate, methyl ethyl ketone, isopropanol, n-butanol, diacetone alcohol or mixtures thereof and adding and also dissolving or dispersing UV-absorbers, light stabilisers and, optionally, standard auxiliaries. The primer thus produced, which is ready for use, generally has a solids content of from about 1 to 30% by weight, preferably from 15 to 25% by weight. The primer is applied to the surface of the plastics moulding in the required layer thickness by standard methods, such as dip-coating, spray-coating, casting, knife-coating and roll-coating, and generally stoved for 10 to 60 minutes at temperatures in the range of from about 90° to 180° C., preferably from 100° to 130° C. It is also possible to apply the primer from an aqueous dispersion which may contain organic solvents. The primer layer may also be hardened by high-energy radiation, for example by electron irradiation.

The second layer of the coating is produced by stoving a mixture of a thermoplastic acrylic resin, an aliphatic or cycloaliphatic masked polyisocyanate and a plasticiser. This layer preferably contains no UV-absorbers and/or light-stabilisers and no standard auxiliaries. In cases where UV-absorbers, light stabilisers and standard auxiliaries are to be used, the same additives used for the primer layer may be used in substantially the same quantities. In that case, the catalysts used, in addition to the catalysts mentioned for the production of the primer layer, are for example tertiary aliphatic amines, salts of tertiary aliphatic amines with organic acids, or dibutyl tin dicarboxylate, although it is preferred not to use any catalysts in the production of the second layer.

The coating composition for the second layer is prepared in the same way as the primer and applied and stoved under the same conditions as the primer layer. In the form in which it is ready for use, the coating composition for the second layer generally has a solids content of from 1 to 10% by weight, preferably from 3 to 6% by weight.

The thermoplastic acrylic resin present in the second layer may be a polymer containing polymerised units of
I. from 100 to 20% by weight of a (meth)acrylic acid alkyl ester containing from 1 to 12 carbon atoms in the alcohol component, preferably methyl methacrylate,
II. from 0 to 80% by weight of at least one (meth)acrylic acid alkyl ester, different from I, containing from 1 to 12 carbon atoms in the alcohol component, preferably n-butyl or 2-ethyl hexyl acrylate or mixtures thereof, and optionally, III. up to 30% by weight of styrene, styrene substituted by $C_1$–$C_4$-alkyl in the vinyl group and/or in the benzene nucleus, vinyl acetate, (meth)acrylamide, (meth-)acrylic acid, acrylonitrile, or mixtures thereof [(meth)acrylamide and (meth)acrylic acid only up to 5% by weight], the sum of the percentage contents amounting to 100.

The thermoplastic acrylic resins are known and are produced by known methods (cf. U.S. Pat. Nos. 3,594,264; 4,224,378; 3,674,734 and 2,934,509; GB-PS No. 618,691; DE-OS No. 19 18 893, DE-AS No. 15 69 040; Houben-Weyl, Methoden der Organischen Chemie, 1962, Georg Thieme Verlag, Stuttgart, Vol. XIV/1 page 1033 to 1072). The molecular weights $\overline{M}n$ of the thermoplastic acrylic resins, as measured by gel permeation chromatography, are preferably in the range of from 5000 to 100,000 and, more preferably, from 10,000 to 40,000.

Thermoplastic acrylic resins of components I and II are preferred.

The masked polyisocyanates used for the production of the second layer are derived from lacquer-grade polyisocyanates, i.e. from polyisocyanates containing in particular biuret, urethane or isocyanurate groups and having an average NCO-functionality of more than 2 and preferably between 2.5 and 6. Polyisocyanates such as these contain aromatically, cycloaliphatically or aliphatically bound isocyanate groups. Polyisocyanates containing aliphatically and/or cycloaliphatically bound isocyanate groups are preferably used for light-stable coatings. They generally have an NCO-content of from 10 to 30% by weight, based on solids.

Suitable diisocyanates for producing the lacquer-grade polyisocyanates are, for example, 2,4- and/or 2,6-diisocyanatotoluene, 2,4'-diisocyanato-dicyclohexyl methane, 4,4'-diisocyanato-dicyclohexyl methane, hexamethylene diisocyanate or 1-isocyanato-3,3,5-trimethyl-5-isocyanatomethyl cyclohexane (IPDI). Hexamethylene diisocyanate and IPDI are the preferred diisocyanates. The lacquer-grade polyisocyanates are produced from the starting diisocyanates mentioned by way of example by known methods. Thus, the lacquer-grade polyisocyanates containing biuret groups may be produced by the process according to U.S. Pat. Nos. 3,124,605, 3,358,010, 3,903,126; 3,903,127 or 3,976,622. Urethane polyisocyanates suitable for use in accordance with the invention are produced, for example, in accordance with U.S. Pat. No. 3,183,112, whilst lacquer-grade polyisocyanates containing isocyanurate groups suitable for use in accordance with the invention are produced, for example, by the processes according to British Pat. Nos. 1,060,430; 1,234,972; 1,506,373; 1,166,316 or 1,458,564 or according to U.S. Pat. Nos. 3,394,111; 3,645,979 or 3,919,218.

Particularly preferred lacquer-grade polyisocyanates include the biuret polyisocyanates according to U.S. Pat. No. 3,124,605, particularly those based on hexamethylene diisocyanate, and the known isocyanurate polyisocyanates of hexamethylene diisocyanate, IPDI or mixtures of hexamethylene diisocyanate with IPDI according to U.S. Pat. No. 3,919,218.

Preferred masking agents (blocking agents) for the polyisocyanates are phenols, $\epsilon$-caprolactam, imidazolines, more particularly malonic acid diethyl ester and/or acetoacetic acid ethyl ester. These and other masking agents are described in High Polymers, Vol. XVI, Part I, Polyurethanes, Chemistry and Technology, page 120, by J. H. Saunders and K. C. Frisch, Interscience Publishers (1962) and in European Pat. No. 0001467.

Preferred plasticisers for the second layer of the coating are alkyl sulphonic acid esters of phenol and/or cresol containing on average from 10 to 18 carbon atoms in the alkyl group.

Other suitable plasticisers include phthalic acid dialkyl esters containing from 1 to 6 carbon atoms in each alkyl group, adipic acid dialkyl esters containing from 2 to 6 carbon atoms in each alkyl group, chloroparaffins, phosphoric acid esters, such as diphenyl cresyl phosphate, diphenyl xylenyl phosphate, diphenyl octyl phosphate, trioctyl phosphate, tricresyl phosphate, triphenyl phosphate, trichloroethyl phosphate, etc.

The binder for the second layer preferably consists of 20 to 60% by weight of thermoplastic acrylic resin, 20 to 60% by weight of masked polyisocyanate and 20 to 60% by weight of plasticiser, based on binder. The stoved coating also contains the above-mentioned components or their conversion products in substantially the same proportions less the percentage of masking agents where they are not incorporated in the polymer.

The third layer of the coating (cover layer) is formed by stoving a binder mixture of an at least partially hydrolysed organosiloxane, an $\alpha,\omega$-dihydroxy polydimethyl siloxane, a silica sol and at least one masked polyisocyanate in the presence of a water-soluble organic or inorganic acid, such as formic acid, acetic acid, propionic acid or hydrochloric acid, and contains at least one UV-absorber. If the cover layer is also intended to contain light stabilisers, the agents used may be the same as those used for the primer layer. Catalysts are preferably not used in the production of the third layer. If it is desired to use catalysts, it is possible to use the same catalysts which were mentioned in respect of the second layer. Levelling agents, deaerating agents, solution promotors, matting agents, gloss-improving agents, oxidation inhibitors, heat stabilisers etc, may be used in the usual quantities as further auxiliaries in the production of the cover layer.

The coating composition for the cover layer may be prepared by adding the organosilanes and the $\alpha,\omega$-dihydroxy polydimethyl siloxane (=auxiliary for influencing hardness and surface smoothness) with stirring to a mixture of the silica sol, acetic acid, water and preferably a water-miscible organic solvent and heating the mixture for 1 to 12 hours to a temperature of from 50° to 80° C., as a result of which the organosilanes are partially hydrolysed. However, it is also readily possible initially to subject the organosilanes to partial hydrolysis and then to add the silica sol and the $\alpha,\omega$-dihydroxy polydimethyl siloxane. After cooling, an organic solution or aqueous dispersion of the masked polyisocyanate, which may contain such auxiliaries as solution promoters, etc., UV-absorbers and, optionally, other auxiliaries are added and dissolved or dispersed.

The final coating composition (=aqueous dispersion containing organic solvents) thus obtained for the cover layer generally has a solids content of from about 15 to 30% by weight. The binder mixture (100%) preferably consists of 56 to 85% by weight of partially hydrolysed organosilanes, 0.02 to 4.5% by weight of $\alpha,\omega$-dihydroxy polydimethyl siloxane (100%), 5 to 35% by weight of colloidal silica (100%) and 0.5 to 4.5% by weight of masked polyisocyanate.

The following are examples of suitable organosilanes which may be at least partly hydrolysed by hydrolysis in water for about 1 to 12 hours at 50° to 80° C. in the presence of a water-soluble organic or inorganic acid:

(a) hydrocarbon trialkoxy silanes corresponding to the formula R'Si(OR")$_3$, wherein R' is a C$_1$–C$_4$-alkyl group, a phenyl group or a vinyl group and R" is a C$_1$–C$_4$-alkyl group, and/or (b) co-condensation products of (a) and, based on (a), 1 to 40% by weight of a phenyl or vinyl trialkoxy silane in which the alkoxy group contains from 1 to 4 carbon atoms, and/or (c) co-condensation products of 1 mole of (a) and 0.01 to 0.5 mole, preferably 0.05 to 0.2 mole, of tetraalkoxy silane, in which the alkoxy group contains 1 to 4 carbon atoms.

Particular reference is attributed to the co-condensation products (c) of the alkyl trialkoxy silanes specified in (a), particularly methyl triethoxy silane, and the tetraalkoxy silanes mentioned, particularly tetraethoxy silane.

The production of partial hydrolysates such as these is known per se and is described, for example, in U.S. Pat. No. 3,451,838; DE-OS No. 1,923,290 and in U.S. Pat. No. 4,006,271.

The polysiloxanes containing terminal hydroxy groups (=α,ω-dihydroxy polydimethyl siloxanes) are low-viscosity, crystal-clear liquids known per se which are soluble in the aqueous-alcoholic solutions or preparations in question. The siloxane chain should generally have a chain length of from about 1 to 25, preferably from 2 to 20 and, more preferably, from 4 to 15. Materials of this type preferably have an average molecular weight of approximately 150 to 1800. Preferred substituents on the Si-atom are methyl groups.

The colloidal silica added is generally present in the binder mixture in the form of a 20 to 35% by weight silica sol having a specific surface of from about 50 to 600 m$^2$/g, preferably from 200 to 400 m$^2$/g, as measured by the BET method.

Suitable masked polyisocyanates are the same as those present in the binder for the second layer of the coating. In this case, too, masked polyisocyanates based on hexamethylene diisocyanate and/or IPDI are particularly preferred.

As already mentioned, suitable UV-absorbers are the same compounds as mentioned for the primer layer. UV-absorbers of the benzophenone type, more specifically 2-hydroxy-4-methoxy benzophenone, are particularly preferred for the third layer.

Examples of suitable organic solvents which are used in the production of the coating composition for the cover layer are alcohols, ketones, ethers, glycol ethers, glycol ether esters and/or aromatic hydrocarbons. Of these solvents, ethyl glycol, ethanol and isopropanol are particularly preferred for the production of the coating composition. The quantity of organic solvents must be sufficient for completely dissolving the partially hydrolysed compound together with the acid and the other additives mentioned and for adjusting the concentration of the partly hydrolysed compound to 5 to 15% by weight, expressed as solids and based on the total weight of the coating composition, for the cover layer.

The components of the binder or their conversion products and of the UV-absorber are preferably present in the following proportions in the stoved cover layer:

SiO$_2$ and R SiO$_{3/2}$-units, emanating from the hydrolysed silanes, α,ω-dihydroxy polydimethyl siloxane and silica sol 90.8 to 98% by weight; polyisocyanate conversion product 0.15 to 1.2% by weight and UV-absorber 0.5 to 8% by weight.

If light stabilisers are also present in the stoved cover layer, the cover layer consists of 87.8 to 98% by weight of SiO$_2$ and R SiO$_{3/2}$-units, 0.15 to 1.2% by weight of polyisocyanate conversion product, 0.5 to 8% by weight of UV-absorber and 0.1 to 3% by weight of light stabiliser.

The parts and percentages quoted in the description and in the Examples represent parts and percentages by weight unless otherwise indicated.

EXPERIMENTAL SECTION

Production And Description Of The Starting Materials

A. The hardenable acrylic resin (A) used in Example 1 according to the invention and in the Comparison Examples (Table II) for the production of the primer layer is a standard commercial product consisting of a copolymer of copolymerised units of
15% by weight of methacrylic acid 2-hydroxyethyl ester,
62% by weight of methyl methacrylate,
5% by weight of ethyl acrylate and
17% by weight of 2-ethylhexyl acrylate.
Its average molecular weight $\overline{M}_n$ is 7000, as measured by gel permeation chromatography.

B. The thermoplastic acrylic resin (B) used in Example 1 according to the invention and in the Comparison Examples (Table II) for producing the second layer of the coating is a standard commercial product and consists of a copolymer of copolymerised units of
80% by weight of methylmethacrylate and
20% by weight of n-butyl acrylate having an average molecular weight $\overline{M}_n$ of approximately 19,000 as measured by gel permeation chromatography.

C. The aminoplast resin used in Example 1 according to the invention is hexamethoxy methyl melamine.

D. The masked polyisocyanate (D) used in Example 1 according to the invention is a standard commercial product, namely trimerised 1,6-hexane diisocyanate (=isocyanto-polyisocyanurate, average molecular weight 1200), of which the free isocyanate groups (approximately 20% by weight) are masked with a mixture of malonic acid diethyl ester/acetoacetic acid ethyl ester (molar ratio 1:1). The masked polyisocyanate (D) is used in the form of a 75% by weight solution in ethyl glycol acetate/xylene (ratio by weight 1:1).

E. The masked polyisocyanate (E) used in Example 1 according to the invention is a standard commercial product consisting essentially of N',N",N'''-tris-(6-isocyanatohexyl)-biuret in which approximately 82% of the free isocyanate groups are masked with malonic acid diethyl ester. The remaining NCO-groups are reacted with sodium-2,4-diaminobenzene sulphonate. Polyisocyanurate (E) is used in the form of a 75% solution in isopropanol. 5% by weight of a polyethoxylated n-butanol (molecular weight approximately 2000) are added to the solution as solution promoter (auxiliary), based on the total solids content of the solution.

The end product does not contain any free isocyanate groups.

Instead of using sodium 2,4-diaminobenzene sulphonate, it is also possible to use an equivalent quantity of 2-(2-aminoethylamino)-ethane sulphonic acid (sodium salt).

F. The partially hydrolysed organosilane used in Example 1 according to the invention and in the Comparison Examples (Table II) is produced as follows:

19.8 g of glacial acetic acid, 210 g of distilled water and 227 g of isopropanol are added to 300 g of silica sol containing 30% by weight of $SiO_2$ and having a specific surface of 300 m$^2$/g. After thorough mixing, a mixture of 900 g of methyl triethoxy silane, 30 g of tetraethoxy silane and 1.5 g of hydroxyl-terminated polydimethyl siloxane having an average chain length of 5.5 is added, after which the mixture as a whole is heated with stirring to 60° C. After 4 hours at that temperature, another 1200 g of isopropanol are added to the mixture. After the product has been cooled to room temperature, the slightly opaque solution is filtered. The solution contains a partial hydrolysate of tetraethoxy silane (0.67%, expressed as $SiO_2$) and a partial hydrolysate of methyl triethoxy silane (11.73%, expressed as $CH_3SiO_{1.5}$).

G. Primer according to the invention:

A solution of the hardenable acrylic resin (A) is mixed with hexamethoxy methyl melamine and p-toluene sulphonic acid, 2-(2'-hydroxy-3',5'-diamylphenyl)benztriazole (UV-absorber) and bis-(1,2,2,6,6-pentamethyl-4-piperidyl)-sebacate (light stabiliser) are introduced into and dissolved whilst stirring in the resulting solution. The primer has the following percentage composition:

|  |  |
|---|---|
| 15.4% | by weight of copolymer (A) dissolved to form a 51% solution in a mixture of xylene and ethyl glycol acetate (ratio by weight 1:1) |
| 15.4% | by weight of hexamethoxy methyl melamine (100%) |
| 1.4% | by weight of p-toluene sulphonic acid (40% in isopropanol) |
| 27.2% | by weight of methyl ethyl ketone |
| 27.2% | by weight of isopropanol |
| 6.1% | by weight of diacetone alcohol |
| 7.0% | by weight of UV-absorber |
| 0.3% | by weight of light stabiliser |
| Total 100.0% | by weight |

The primer has a solids content of 25% by weight.

H. Coating composition (Z) (Z=second layer):

The thermoplastic acrylic resin (B) is dissolved in a solvent mixture (V) of methyl ethyl ketone (45%)/isopropanol (45%)/diacetone alcohol (10%) and the resulting solution is mixed with the plasticiser, alkyl sulphonic acid phenyl ester, containing an average of 15 carbon atoms in the alkyl group and then with the masked polyisocyanate (D) (75% solution).

The coating composition (Z) has the following percentage composition:

|  |  |
|---|---|
| 1.34% | by weight of thermoplastic acrylic resin (B) |
| 1.3% | by weight of plasticiser |
| 1.8% | by weight of masked polyisocyanate (D) (75% solution) |
| 95.56% | by weight of solvent mixture (V) |
| Total 100.00% | by weight. |

The coating composition (Z) has a solids content of approximately 4% by weight.

I. Coating composition (D) (D=cover layer):

The partially hydrolysed organosilane according to (F) is mixed while stirring with the masked polyisocyanate (E) and the UV-absorber, 2-hydroxy-4-methoxy benzophenone. The coating composition (D) has the following percentage composition:

3.46% by weight of colloidal silica ($SiO_2$)
0.67% by weight of tetraethoxy silane hydrolysate
11.73% by weight of methyl triethoxy silane hydrolysate
0.05% by weight of polydimethyl siloxane terminated by hydroxyl groups
24.89% by weight of $H_2O$
49.405% by weight of isopropanol
0.69% by weight of acetic acid (100%)
0.08% by weight of masked polyisocyanate (E) (75%)
0.005% by weight of polyethoxylated butanol (100%)
0.02% by weight of sodium-2,4-diaminobenzene sulphonate (100%)
4% by weight of UV absorber The coating composition (D) has a solids content of 16.01% by weight (without acetic acid).

EXAMPLES

EXAMPLE 1 (According to the invention)

3 mm thick plates (12×5 cm) of standard commercial polycarbonate (PC) based on bisphenol A ($\eta_{rel}$ 1.31) are cleaned with isopropanol or fluorinated hydrocarbons.

(a) The PC plate is provided on its surface with an approximately 25,000 nm thick primer by immersion (immersion rate $v=100$ cm·min$^{-1}$) in the primer according to (G) at room temperature t=approximately 23° C. After airing for 10 minutes at room temperature, the primer layer is stoved for 30 minutes at 120° C. The stoved primer layer has a thickness of approximately 5000 nm.

(b) A second layer approximately 12,000 nm thick is applied to the surface of the primed PC-plate at room temperature by immersion in the coating composition (Z) (immersion rate $v=100$ cm·min$^{-1}$). After airing for 5 minutes at room temperature, the second layer is stoved for 15 minutes at 120° C. The stoved second layer has a thickness of approximately 500 nm.

(c) The PC-plate finished in accordance with (b) is provided with a cover layer approximately 25,000 nm thick by immersion at room temperature in the coating composition (D) (immersion rate $v=40$ cm·min$^{-1}$). After airing for 10 minutes at room temperature in relative air humidity of less than 40%, the cover layer is stoved for 60 minutes at 120° C. The stoved cover layer is approximately 6000 nm thick.

After hardening, the coated plates are stored for 2 days at room temperature and then subjected to the following tests. The results of the tests are set out in Table 1.

1. Bond Strength To Substrate

In accordance with DIN 53 151, the hardened layer applied to the plate is cut crosswise down to the substrate using a sharp razor blade so that 100 squares occupying an area of 1 mm$^2$ are formed. The test according to DIN 53 151 is then intensified by firmly applying an adhesive tape of cellophane to the lines cut in crosswise and pulling it off at an angle of 90° to the applied layer. This process is repeated three times. The adhesion values obtained are divided into classes of 0 (no delamination) to 4 (complete delamination), depending upon the number of "cells" left behind.

2. Scratch Resistance (Steel Wool Abrasion Test)

The coated surface of the plates is rubbed with a sample of steel wool having a fineness of 0000. The results are evaluated in accordance with the following 5 categories, depending on the extent to which the surface was scratched.
A=no scratches
B=slightly scratched,
C=heavily scratched.

3. Weathering

Artificial weathering is carried out in a Weather-O-Meter of the Xeno-Test 1200 type manufactured by the Hareus Company of Hanau. The shorter-wave fraction down to <280 nm is filtered out by means of a special UV filter. The test specimens are exposed to the irradiation and then to darkness at intervals of 36 seconds. At the same time, the test specimens are sprayed with water and then left unsprayed for 17 minutes at 3 minute intervals. After weathering for 250 hours, the test specimens are tested for bond strength and scratch resistance of the coating and for yellowing and degradation of the substrate.

4. Yellowing

Yellowing is determined in accordance with DIN 53 230 by visual comparison of the non-weathered test specimens and the weathered test specimens. In the following scale:
0=clear, no yellowing
1=traces of yellowing
2=slight yellowing
3=fairly serious yellowing
4=serious yellowing
5=very serious yellowing

5. Degradation

Degradation is measured in accordance with DIN 53 230 using the following scale:
0=no degradation,
1=slight spotting, still transparent
2=spotting, slightly opaque
3=surface slightly clouded
4=surface clouded, slight white coating
5=surface opaque, heavy grey-white coating.

TABLE I

| PC-plate | | Bond strength cross-cutting (test 1) | Scratch resistance steel wool (test 2) | Yellowing DIN 53230 | Degradation DIN 53230 |
|---|---|---|---|---|---|
| a | uncoated (Comparison 1) | — | C | 0 | 0 |
| b | uncoated after-weathering for 250 hours (Comparison 2) | — | C | 5 | 4 |
| c | coated in accordance with with Examples 1a + 1b + 1c (invention) | 0 | A | 0 | 0 |
| d | coated in accordance with Examples 1a, 1b and 1c, and weathered for 2000 hours (invention) | 0 | A | 0 | 0–1 |

As can be seen from Table 1, the surfaces of polycarbonate mouldings which have been provided with a three-layer coating in accordance with the invention show good adhesion and scratch resistance. The polycarbonate itself also shows no yellowing and no degradation. Substantially the same results are also obtained after weathering for 2000 hours.

Equally good results are obtained with polymethyl methacrylate mouldings, polyamide mouldings and polyester mouldings after finishing in accordance with the invention.

Table II below shows the results obtained with the polycarbonate moulding when coated solely with the primer (Comparison 1a) or solely with the coating composition for the second layer (Comparison 1b) or solely with the coating composition for the cover layer (Comparison 1c). After weathering for 2000 hours, combinations 1a+1c, 1b+1c and 1a+1c show inadequate adhesion and scratch resistance of the coating and undesirable yellowing and degradation of the polycarbonate.

TABLE II

| PC-plate finished in accordance with | Bond strength (Test 1) | Scratch resistance (Test 2) | Yellowing DIN 53230 | Degradation DIN 53230 |
|---|---|---|---|---|
| 1a Comparison (not weathered) | 0 | C | 0 | 0 |
| 1a Comparison (after weathering for 2000 hours) | 1 | C | 0 | 0–1 |
| 1b Comparison (not weathered) | 0 | C | 0 | 0 |
| 1b Comparison (after weathering for 2000 hours) | 4 | C | 5 | 5 |
| 1c Comparison (not weathered) | 0 | A | 0 | 0 |
| 1c Comparison (after weathering for 2000 hours) | 4 | C (loss of adhesion) | 5 | 5 |
| 1a + 1c Comparison (not weathered) | when the cover lacquer is stoved, cracks appear in the cover layer, no further test | | | |
| 1b + 1c Comparison (not weathered) | 0 | A | 0 | 0 |
| 1b + 1c Comparison (after weathering for 2000 hours) | 4 | C | 4 | 4 |
| 1a + 1b Comparison (not weathered) | 0 | C | 0 | 0 |

TABLE II-continued

| PC-plate finished in accordance with | Bond strength (Test 1) | Scratch resistance (Test 2) | Yellowing DIN 53230 | Degradation DIN 53230 |
|---|---|---|---|---|
| 1a + 1b Comparison (after weathering for 2000 hours) | 1 | C | 0 | 0-1 |
| 1a + 1b + 1c Invention (after weathering for 2000 hours) | 0 | A | 0 | 0-1 |

Comparison Test 1 With U.S. Pat. No. 4,224,378

Example 2 of the U.S. Patent is repeated exactly, a polycarbonate primed with polymethyl methacrylate being obtained. The stoved primer had a layer thickness of approximately 500 nm. Similarly, a polycarbonate primed with polymethyl methacrylate in a layer thickness of approximately 11,500 nm was obtained in accordance with Example 3 of the U.S. Patent. The primer layers also contained 30% by weight, based on the solids content of the primer, of 2-(2'-hydroxy-3',5'-diamylphenyl)-benztriazole (UV-absorber) in the same way as the primer according to the invention.

PC-plates obtained in accordance with Examples 2 and 3 plus UV-absorber were coated with the organopolysiloxane indicated in Example 4 of the U.S. Patent, dried in air for 30 minutes and hardened for 1 hour at 125° C. The stoved cover layer had a thickness of approximately 6000 nm in each case.

The sample of Examples 2 and 4 (primer layer approximately 500 nm thick, cover layer approximately 6000 nm thick) is termed test specimen A and the sample of Examples 3 and 4 (primer layer approximately 11,500 nm thick, cover layer approximately 6000 nm thick) is termed test specimen B. The test specimens were tested for adhesion and scratch resistance or crazing of the coating and for yellowing and degradation of the polycarbonate. The results are set out in Table III.

TABLE III

| PC-plate | Adhesion | Scratch resistance | Yellowing | Degradation |
|---|---|---|---|---|
| Test speciment A not weathered | 0 | A | 0 | 0 |
| Test specimen A weathered for approximately 1000 hours | 4 | C | 4-5 | 4-5 |
| Test specimen B not weathered | after stoving, the stoved cover layer shows serious crazing so that no further tests were carried out. | | | |

Comparison Example 2 With U.S. Pat. No. 3,707,397

3 mm thick polycarbonate panels (10×5 cm) were coated in accordance with Example 1-B of the U.S. Patent with the hardenable acrylic resin so that, after drying in air for 30 minutes, an approximately 250 nm thick primer and an approximately 12500 nm thick primer were obtained. In the case of the 12500 nm thick primer, a primer solution having a solids content of 40% by weight was used. Following the procedure of Example 1-D, the PC-plates were coated with the hardenable polysiloxane solution according to Example 1-A and hardened in each case for 35 minutes at 135° C. The stoved cover layer was approximately 12,500 nm thick in each case. The samples with the approximately 250 nm thick primer layer and the 12,500 nm thick cover layer are termed test specimen C and the samples with an approximately 12,500 nm primer layer and a 12,500 nm thick cover layer are termed test specimen D.

The test specimens were tested for adhesion, scratch resistance and crazing of the coating and for yellowing and degradation of the polycarbonate.

The results are set out in Table IV.

TABLE IV

| PC-plate | Adhesion | Scratch resistance | Yellowing | Degradation |
|---|---|---|---|---|
| Test specimen C, not weathered | 0 | A | ? | ? |
| Test specimen C, weathered for 1000 hours | 4 | C | 5 | ? |
| Test specimen D, not weathered | after stoving of the cover layer, crazing is observed therein so that no further tests are carried out. | | | |

We claim:

1. A plastics moulding finished with a coating of three successively stoved layers, the first stoved layer applied to the surface of the plastics moulding being produced from a binder mixture of a hardenable acrylic resin and an aminoplast resin and containing at least one UV-absorber and at least one light stabiliser, the second stoved layer being produced from a binder mixture of a thermoplastic acrylic resin, a masked polyisocyanate and a plasticiser, and the third stoved layer being produced from a binder mixture of at least one partially hydrolysed organosilane, an α,ω-dihydroxy polydimethyl siloxane, a silica sol and at least one masked polyisocyanate in the presence of a water-soluble organic or inorganic acid and contains at least one UV-absorber.

2. Plastics mouldings as claimed in claim 1, wherein the first layer has a thickness of from 100 to 30,000 nm, the second layer has a thickness of from 10 to 5000 nm and the third layer has a thickness of from 1000 to 30,000 nm.

3. Plastics mouldings as claimed in claim 1, wherein the plastics moulding and the stoved three-layer coating are transparent.

4. A process for producing a coating of three layers on a thermoplastic plastics moulding by means of coating compositions in organic solution or aqueous dispersion containing organic solvents, incorporating binders, UV-absorbers, light stabilisers and standard auxiliaries which process comprises applying and stoving the coating compositions in three successive stages, the binder for the first layer (primer layer) comprising a mixture of a hardenable acrylic resin and an aminoplast resin and containing at least one UV-absorber and at least one light stabiliser, the binder for the second coating layer comprising a thermoplastic acrylic resin, a masked polyisocyanate and a plasticiser, and the binder mixture for the third coating layer comprising at least one partially hydrolysed organosilane, an $\alpha,\omega$-dihydroxy polydimethyl siloxane, a silica sol, a water-soluble inorganic or organic acid and at least one masked polyisocyanate and containing at least one UV-absorber.

* * * * *